United States Patent [19]

Russell et al.

[11] Patent Number: 4,756,088
[45] Date of Patent: Jul. 12, 1988

[54] INSTRUMENTS FOR MONITORING THE DIRECTION OF A BOREHOLE

[75] Inventors: Anthony W. Russell, Aberdeenshire, Scotland; Michael K. Russell, Cheltenham, United Kingdom

[73] Assignee: NL Industries, Inc., New York, N.Y.

[21] Appl. No.: 410,095

[22] Filed: Aug. 20, 1982

[30] Foreign Application Priority Data

Aug. 20, 1981 [GB] United Kingdom ............... 8125409
Aug. 4, 1982 [GB] United Kingdom ............... 8222437

[51] Int. Cl.$^4$ .................. G01C 9/06; G01C 19/00
[52] U.S. Cl. .................................. 33/312; 33/313; 33/318
[58] Field of Search ............... 33/313, 312, 304, 302, 33/318

[56] References Cited

U.S. PATENT DOCUMENTS

| | | | |
|---|---|---|---|
| 4,071,959 | 2/1978 | Russell et al. | 33/313 |
| 4,199,869 | 4/1980 | Van Steenwyk. | |
| 4,238,889 | 12/1980 | Barriac | 33/304 |
| 4,244,116 | 1/1981 | Barriac | 33/304 |

*Primary Examiner*—William D. Martin, Jr.
*Attorney, Agent, or Firm*—Browning, Bushman, Zamecki & Anderson

[57] ABSTRACT

An instrument for monitoring the direction of a borehole comprises an elongate casing having its longitudinal axis coincident, in use, with the axis of the borehole, an outer gimbal pivotally mounted within the casing with its pivot axis coincident with the longitudinal axis of the casing, a gyroscope unit mounted in the outer gimbal, a torque motor and a gravity sensor unit. At the beginning of a run the instrument is positioned at the mouth of the borehole. The rate of rotation about an axis transverse to the outer gimbal axis is then sensed by the gyroscope unit, and the outer gimbal is slewed by the torque motor in dependence on the sensed rate so as to align the transverse axis along an East/West direction. The instrument is then moved along the borehole and the rate of rotation about the outer gimbal axis is continually sensed by the gyroscope unit, the outer gimbal being torqued by the motor in dependence on the sensed rate to stabilize the outer gimbal about its axis. Simultaneously the components of gravity are sensed by the gravity sensor unit. The resulting measurements are used to determine the inclination and azimuth at a plurality of points along the length of the borehole.

7 Claims, 4 Drawing Sheets

—FIG.2—

INSTRUMENTS FOR MONITORING THE DIRECTION OF A BOREHOLE

BACKGROUND OF THE INVENTION

This invention relates to instruments for monitoring the direction of a borehole either continuously or at a series of locations spaced along the length of the borehole, and to methods of surveying a borehole.

A spatial survey of the path of a borehole is usually derived from a series of values of the azimuth angle and the inclination angle taken along the length of the borehole. Measurements from which the values of these two angles can be derived are made at successive locations along the path of the borehole, the distances between adjacent locations being accurately known.

In a borehole in which the earth's magnetic field is unchanged by the presence of the borehole itself, measurements of the components of the earth's gravitational and magnetic fields in the direction of the casing-fixed axes can be used to obtain values for the azimuth angle and the inclination angle, the azimuth angle being measured with respect to an earth-fixed magnetic reference, for example magnetic North. However, in situations in which the earth's magnetic field is modified by the local conditions in a borehole, for example when the borehole is cased with a steel lining, magnetic measurements can no longer be used to determine the azimuth angle relative to an earth-fixed reference. In these circumstances, it is necessary to use a gyroscopic instrument.

Applicants' Great Britain Patent Specification No. 1,509,293 describes such an instrument comprising a casing having its longitudinal axis coincident, in use, with the axis of the borehole, a single-degree-of-freedom gyro comprising an outer gimbal mounted in the casing with its axis coincident with the longitudinal axis thereof, an inner gimbal mounted in the outer gimbal with its axis perpendicular to the outer gimbal axis, a gyro rotor mounted in the inner gimbal, means for sensing angular movement of the inner gimbal relative to the outer gimbal and means for applying a torque to the outer gimbal for rotating it in use about its axis so that the inner gimbal processes back to its initial position, means for measuring the angle of rotation of the casing about its longitudinal axis relative to the outer gimbal and a gravity sensor unit for measuring three components of gravity in three non-coplanar directions.

This instrument has proved to be extremely reliable in practice and has been shown to be capable of an accuracy of up to approximately ±0.1° in inclination and ±1.0° in azimuth. The stated maximum inclination for such an instrument is generally considered to be about 70° to the vertical since surveying at angles in excess of 60° leads to increasingly less accurate surveys as the inclination increases. However, with the trend towards high inclination drilling, there exists an increasing demand for an instrument with an accuracy in azimuth of the same order of magnitude as that attainable in inclination. It is an object of the invention to provide such an instrument.

SUMMARY OF THE INVENTION

According to the invention there is provided an instrument for monitoring the direction of a borehole, comprising an elongate casing having its longitudinal axis coincident, in use, with the axis of the borehole, an outer gimbal pivotally mounted within the casing with its pivot axis coincident with the longitudinal axis thereof, a gyroscope unit mounted in the outer gimbal and adapted to provide outputs indicative of the rates of rotation about the outer gimbal axis and an axis transverse to the outer gimbal axis, torquing means for applying a torque to the outer gimbal, first actuating means for actuating the torquing means when the instrument is disposed at the mouth of the borehole so as to align said transverse axis along an East/West direction in response to the rate of rotation about said transverse axis sensed by the gyroscope unit, second actuating means for actuating the torquing means in response to the rate of rotation about the outer gimbal axis sensed by the gyroscope unit as the instrument is moved along the borehole so as to stabilize the outer gimbal about its axis, and a gravity sensor unit for sensing two components of gravity in two transverse directions.

The use of a two-axis rate gyroscope enables an accuracy of better than ±0.1° in inclination and ±0.2 in azimuth to be achieved. A gyro-compassing technique may be used to align the outer gimbal with true North, and this eliminates the need for the casing reference alignment procedure presently employed with conventional gyroscopic instruments which can be a major source of azimuth error. For inclinations in excess of 45° the outer gimbal may be torqued to maintain the highside angle zero, and the rate measurement of the gyroscope about the transverse axis may be used to compute the azimuth as the instrument is traversed along the path of the borehole.

The invention also provides a method of surveying a borehole comprising positioning at the mouth of the borehole a survey instrument comprising an elongate casing having its longitudinal axis coincident with the axis of the borehole, an outer gimbal pivotally mounted within the casing with its pivot axis coincident with the longitudinal axis thereof, and a gyroscope unit mounted in the outer gimbal and adapted to provide outputs indicative of the rates of rotation about the outer gimbal axis and an axis transverse to the outer gimbal axis; sensing the rate of rotation about said transverse axis by means of the gyroscope unit and applying a torque to the outer gimbal in dependence on the sensed rate so as to align said transverse axis along an East/West direction; moving the survey instrument along the borehole; continually sensing the rate of rotation about the outer gimbal axis by means of the gyroscope unit as the instrument moves along the borehole and applying a torque to the outer gimbal in dependence on the sensed rate so as to stabilize the outer gimbal about its axis; continually sensing two components of gravity in two transverse directions relative to the outer gimbal or the casing; and determining at least the inclination and azimuth of the borehole at a plurality of points along its length from the sensed components of gravity.

BRIEF DESCRIPTION OF THE DRAWINGS

In order that the invention may be more fully understood, two preferred embodiments of the invention will now be described, by way of example, with reference to the accompanying drawings, in which.

DETAILED DESCRIPTION OF THE DRAWINGS

Figure 1:
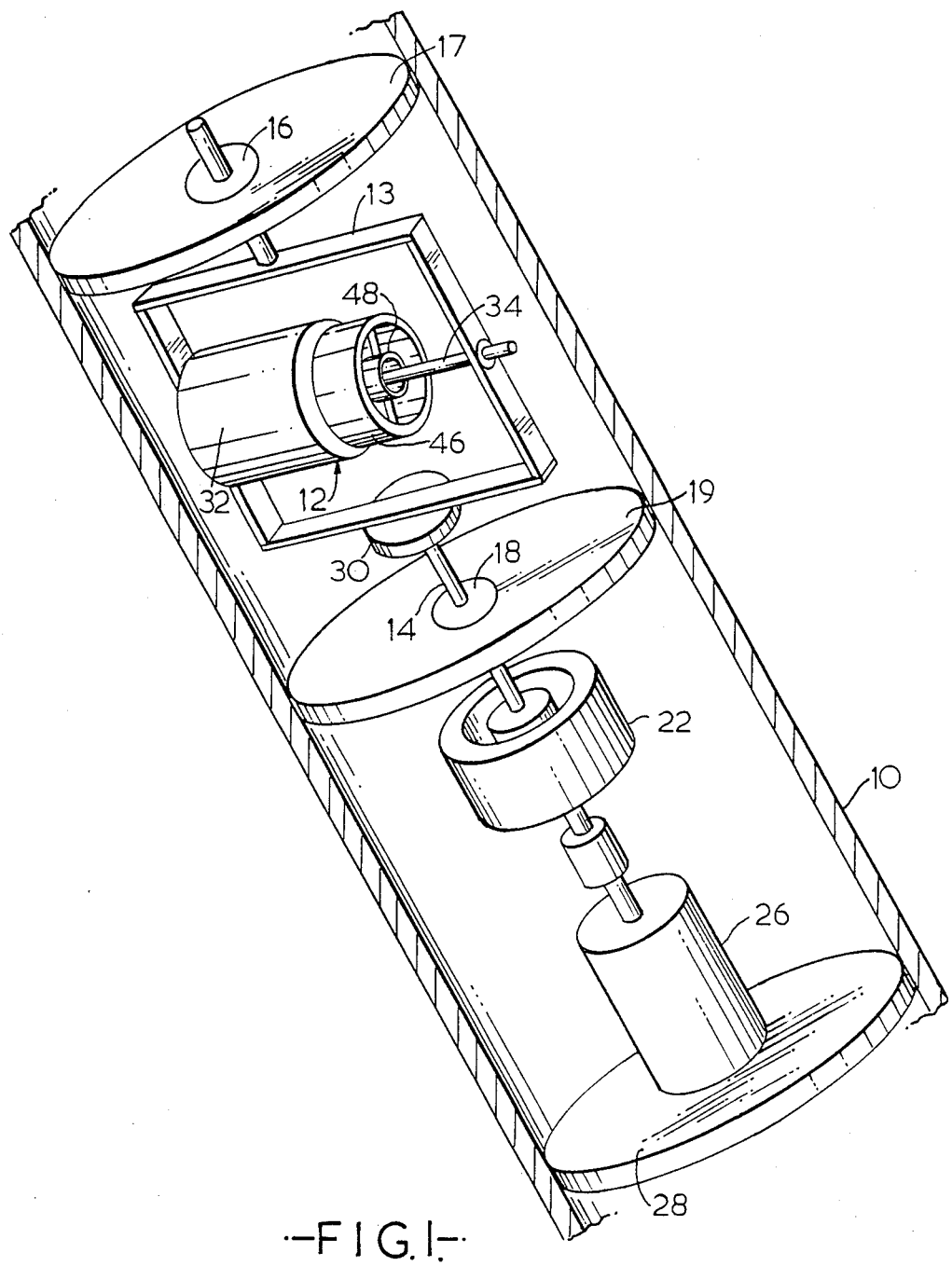
FIG. 1 is a schematic perspective view of a first instrument with its casing shown in section.

Referring to FIG. 1, the instrument comprises, within a casing 10 whose longitudinal axis is coincident with the bore axis, a two-axis dynamically tuned gyroscope 12 mounted within an outer gimbal 13 on an outer gimbal shaft 14 provided with upper and lower outer gimbal bearings 16 and 18 supported by upper and lower outer gimbal bearing mountings 17 and 19. The tuned gyroscope 12 incorporates a gyro-wheel 46 having a spin axis perpendicular to the outer gimbal axis, a first pivot axis transverse to the spin axis and a second pivot axis perpendicular to the first pivot axis and transverse to the spin axis. The outer gimbal shaft 14 is also provided with a torque motor 22 and a resolver 26 supported by a resolver mounting 28. The resolver 26 incorporates a stator comprising a pair of coils with their axes orthogonal to one another and a rotor comprising a corresponding pair of mutually orthogonal coils. If a reference signal is applied to one of the coils on the rotor and the other coil on the rotor is grounded, and the outputs of the two coils on the stator are a and b, then a/b is equal to the tangent of the angle $\phi_1$ between a reference direction with respect to the casing 10 and a reference direction with respect to the outer gimbal shaft 14. The instrument also incorporates a gravity sensor unit 30 comprising three accelerometers mounted on the outer gimbal shaft 14.

Figure 2:
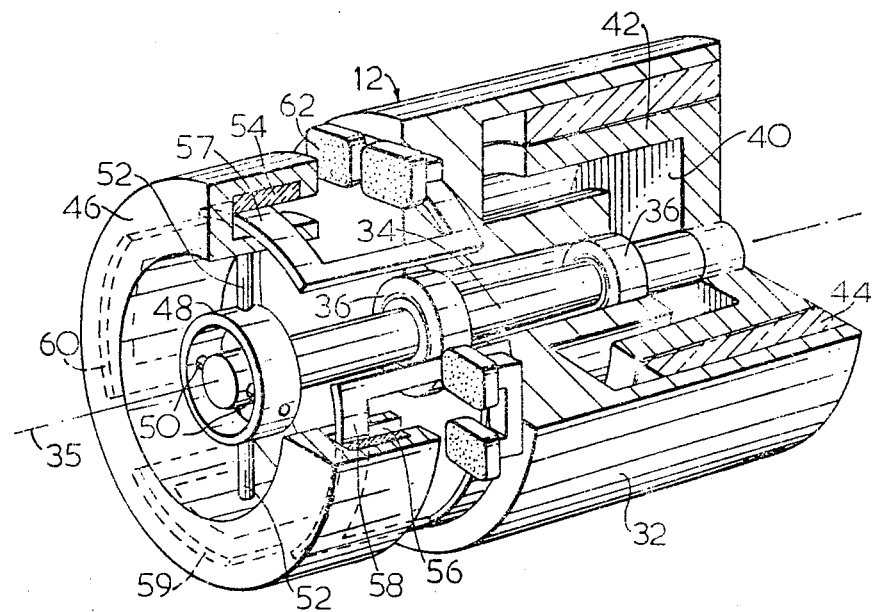
FIG. 2 is a partially cut-away view of a dynamically tuned gyro forming part of the first instrument.

Referring to FIG. 2, the dynamically tuned gyroscope 12 incorporates a housing 32 which is fixed to the outer gimbal 13, a shaft 34 rotatable with respect to the housing 32 and the outer gimbal 13 about the spin axis 35 and provided with spin axis bearings 36, and a drive motor 40 comprising a rotor 42 attached to the shaft 34 and a stator 44 attached to the housing 32. The gyro-wheel 46 is coupled to the shaft 34 by a Hookes joint comprising an inner gimbal 48 pivotal about the first pivot axis by torsion springs 50 extending between the shaft 34 and the inner gimbal 48, the gyro-wheel 46 being pivotal about the second pivot axis perpendicular to the first pivot axis by torsion springs 52 extending between the inner gimbal 48 and the gyro-wheel 46.

The gyro-wheel 46 incorporates a permanent magnet ring 54 and an annular recess 56 immediately adjacent the permanent magnet ring 54 within which four torquing coils 57 to 60 fixed to the housing 32 extend, the coil 57 being disposed diametrically opposite the coil 59 and the coil 58 being disposed diametrically opposite the coil 60. A series of pickoffs 62 fixed to the housing 32 serve to sense angular displacement of the gyro-wheel 46 about the two mutually perpendicular axes. In operation of the gyro the torque applied to the gyro-wheel 46 by the torsion springs 50 and 52 are offset by the negative torque generated due to the dynamic effect of the inner gimbal 48 which varies as the square root of the speed of the gyro-wheel 46. There is therefore only one speed, that is the tuned speed, at which the positive spring torques are cancelled by the dynamic effect. At the tuned speed the gyro-wheel 46 is decoupled from the shaft 34 and so acts as a free gyro.

Figure 3:
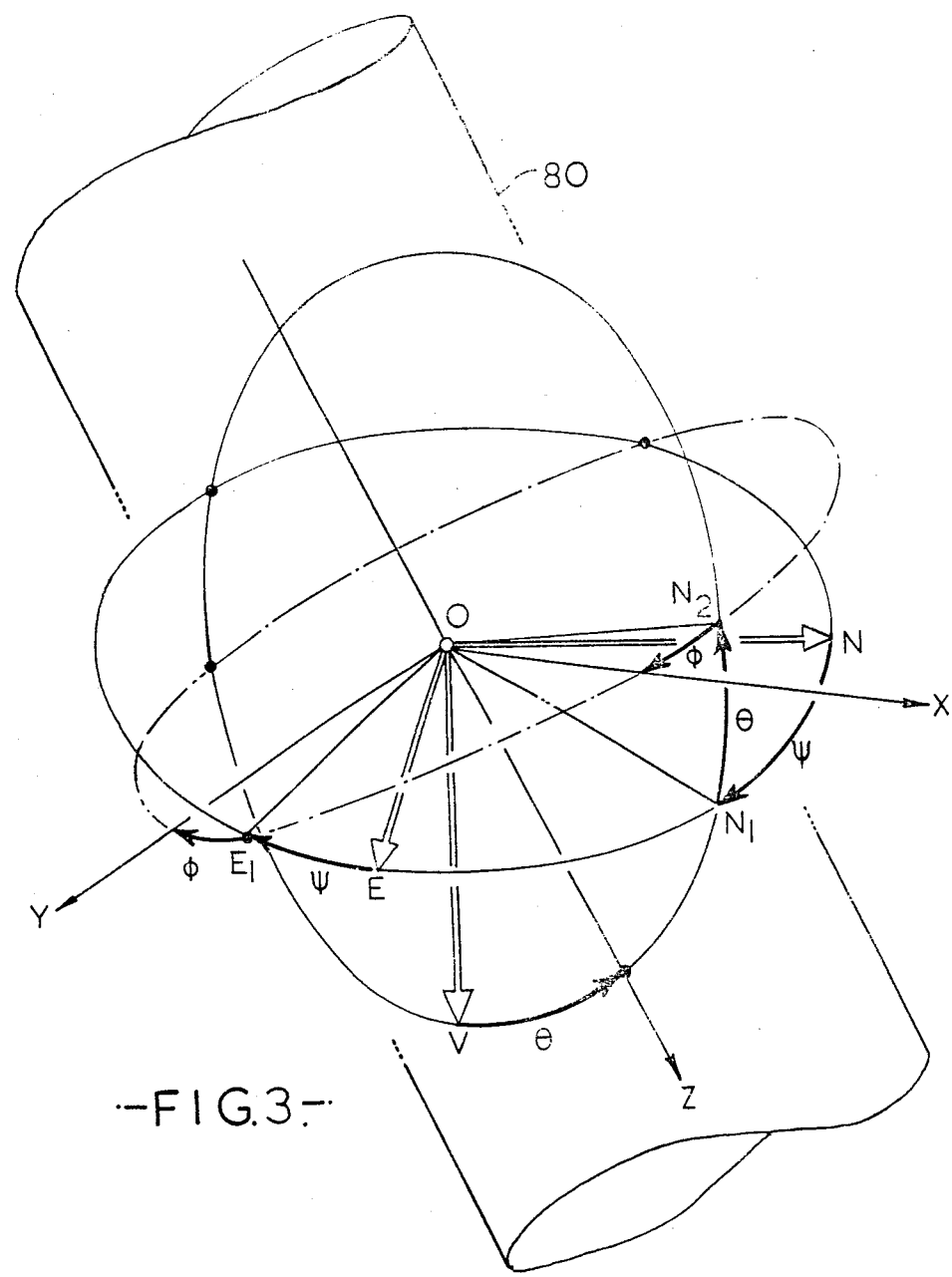
FIG. 3 is a schematic representation illustrating a transformation between two sets of reference axes.
Figures 4, 5, 6:
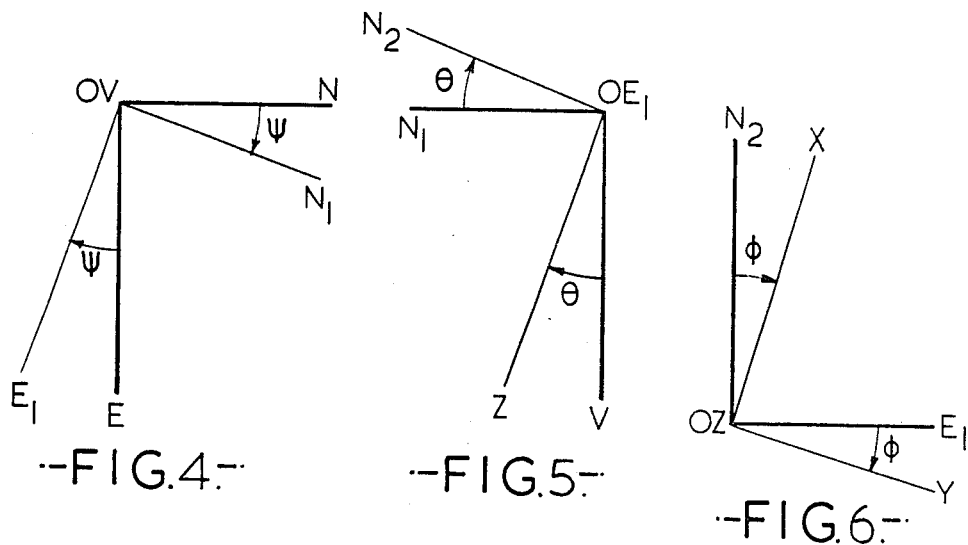
FIGS. 4 to 6 are diagrams illustrating various stages of the transformation shown in FIG. 3.

FIG. 3 schematically illustrates a borehole 80 and various reference axes relative to which the orientation of the borehole 80 may be defined, these axes comprising a set of earth-fixed axes ON, OE and OV where OV is vertically down, ON is due North and OE is due East, and a set of casing-fixed axes OX, OY and OZ where OZ lies along the local direction of the borehole at a measuring station and OX and OY are in a plane perpendicular to this direction. The set of earth-fixed axes can be rotated into the set of casing-fixed axes by the following three clockwise rotations:

(1) rotation about the axis OV through the azimuth angle $\Psi$ as shown in FIG. 4, (2) rotation about the axis $OE_1$ through the inclination angle $\theta$ as shown in FIG. 5, and (3) rotation about the axis OZ through the high-side angle $\phi$ as shown in FIG. 6.

Figure 7:
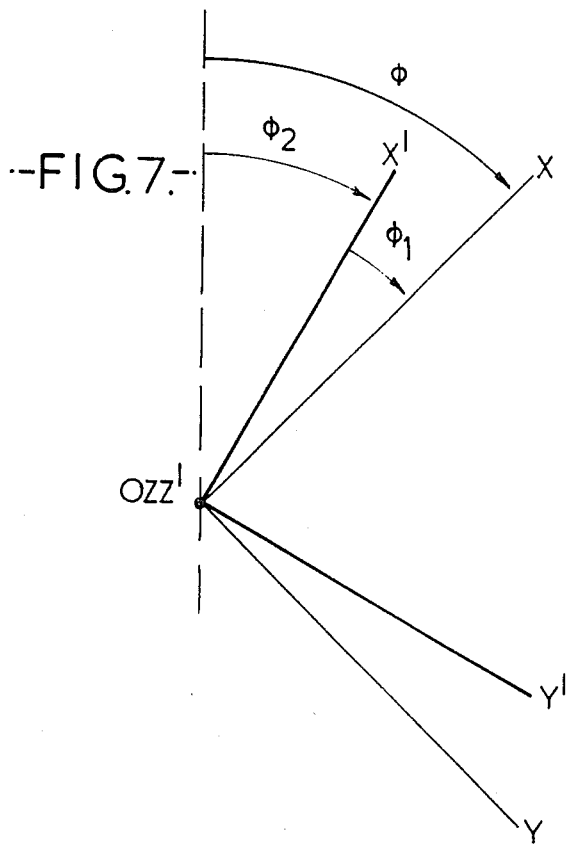
FIG. 7 is a diagram illustrating the relationship between two sets of reference axes.

FIG. 7 schematically illustrates the relationship between the casing-fixed axes OX, OY and OZ and a set of outer-gimbal-fixed axes OX', OY' and OZ' where the axes OZ and OZ' are coincident and are denoted by OZZ' in the figure. This figure also shows the relationship between the high-side angle $\phi$ and the angle $\phi_1$ measured by the resolver 26, $\phi_2$ being the high-side angle which would be obtained if the instrument were to travel to a measurement location without rotation about the casing-fixed axis OZ. Clearly $\phi_2$ is dependent on the shape of the path to be followed by the instrument. It will be appreciated that $\phi = \phi_1 + \phi_2$ if the casing-fixed, earth-fixed and outer-gimbal-fixed axes are coincident at the mouth of the borehole.

The three accelerometers of the sensor unit are arranged to sense components of gravity $g_{X'}$, $g_{Y'}$ and $g_{Z'}$ along the three mutually orthogonal outer-gimbal-fixed axes OX', OY' and OZ', the axis OZ' being coincident with the bore axis. Alternatively the three accelerometers may be mounted on the casing 10 and arranged to sense components of gravity $g_X$, $g_Y$ and $g_Z$ along three mutually orthogonal casing-fixed axes OX, OY and OZ.

If the accelerometers are mounted on the casing, then the gravity vector $\bar{g} = g_X \cdot \bar{U}_X + g_Y \cdot \bar{U}_Y + g_Z \cdot \bar{U}_Z$ where $\bar{U}_X$, $\bar{U}_Y$ and $\bar{U}_Z$ are the unit vectors in the casing-fixed axes directions OX, OY and OZ respectively. If the accelerometers are mounted on the outer gimbal, then the gravity vector $\bar{g} = g_{X'} \cdot \bar{U}_{X'} + g_{Y'} \cdot \bar{U}_{Y'} + g_{Z'} \cdot \bar{U}_{Z'}$ where $\bar{U}_{X'}$, $\bar{U}_{Y'}$ and $\bar{U}_{Z'}$ are the unit vectors in the outer-gimbal-fixed axes directions OX', OY' and OZ' respectively.

Thus, $$g_{X'} = g_X \cos \phi_1 - g_Y \sin \phi_1 \quad \text{(A)}$$

$$g_{Y'} = g_X \sin \phi_1 + g_Y \cos \phi_1 \quad \text{(B)}$$

$$g_{Z'} = g_Z \quad \text{(C)}$$

If $\bar{U}_N$, $\bar{U}_E$ and $\bar{U}_V$ are unit vectors in the earth-fixed axes directions ON, OE and OV respectively, then according to the definition of the angles $\phi$, $\theta$ and the vector operation equation $\bar{U}_{NEV} = \{\Psi\}\{\theta\}\{\phi\}\bar{U}_{XYZ}$ represents the transformation relationship between the sets of unit vectors in the two frames where, $$\begin{bmatrix} \cos\psi & -\sin\psi & 0 \\ \sin\psi & \cos\psi & 0 \\ 0 & 0 & 1 \end{bmatrix} = \{\psi\}$$

$$\begin{bmatrix} \cos\theta & 0 & \sin\theta \\ 0 & 1 & 0 \\ -\sin\theta & 0 & \cos\theta \end{bmatrix} = \{\theta\} \text{ and}$$

-continued $$\begin{bmatrix} \cos\phi & -\sin\phi & 0 \\ \sin\phi & \cos\phi & 0 \\ 0 & 0 & 1 \end{bmatrix} = \{\phi\}$$

The vector operation $\overline{U}_{XYZ} = \{\phi\}^T\{\theta\}^T\{\Psi\}^T U_{NEV}$ represents the transformation relationship in the opposite direction.

The instrument may be operated in three distinct measurement phases to obtain three separate measurements. Firstly, with the instrument disposed vertically at the mouth of the borehole, that is with the OZ' axis aligned with the OV axis, a gyro-compassing technique can be used to align a reference angular position of the outer gimbal 13 with true North. The rate of rotation of the gyro-wheel 46 about the OX' axis due to the rotation of the earth as measured by the appropriate pickoffs 62 of the tuned gyro 12 is fed back to the torque motor 22 by way of suitable control circuitry and used to slow the outer gimbal 13 until the earth's rate of rotation measured about the OX' axis by the tuned gyro 12 is zero when the spin axis 35 (OY' axis) must lie North/South and the OX axis must lie East/West. This North-seeking gyro-compassing phase eliminates the need for the casing-reference alignment procedure presently employed with conventional gyroscopic instruments which can be a major source of azimuth error.

In a second measurement phase, applicable to borehole inclinations of 0° to 45° to the vertical, the inclination of the borehole is measured either continuously or at a series of locations along its length by the surveying method described in Specification No. 1,509,293 except that the initial alignment reference is obtained as described above with reference to the first measurement phase. The rate of rotation of the gyro-wheel 46 about the OZ' axis as measured by the appropriate pickoffs 62 of the tuned gyro 12 is fed back by appropriate control circuitry to the torque motor 22 and used to stabilize the outer gimbal 13 about the OZ' axis so as to maintain the alignment of the OY' axis in the vertical plane lying North/South. The outer gimbal 13 therefore behaves as a single-axis stabilized platform about its axis OZ' which coincides with the casing axis OZ. Thus, the net rotation of the casing 10 about the OZ axis measured with respect to an outer gimbal reference is equal to the sum of all rotations of the casing 10 about the instantaneous directions of OZ as the instrument is moved along the borehole path and is clearly independent of the path followed.

With the instrument described in Specification No. 1,509,293 outer-gimbal drift rates about the OZ axis are of the order of 1° to 10° per hour and drift rate checks are made during the survey. In this manner a rate measurement accuracy of the order of 0.5° per hour can be achieved. By contrast, using the instrument described above, a rate measurement accuracy of the order of 0.1° per hour can be achieved and there is no necessity to stop for drift rate checks during the survey. With suitable programming of the system to correct the accelerometer outputs for the effects of the instrument traversing a non-rectilinear path during surveying, this measurement phase can be carried out in one continuous operation.

In a third measurement phase, applicable to borehole inclinations in excess of 45° to the vertical, the outer gimbal 13 is torqued by the torque motor 22 to maintain the high-side angle $\phi$ as measured by the gravity sensor unit 30 zero. If the three accelerometers yield gravity components along the casing-fixed axes OX, OY and OZ of $g_X$, $g_Y$ and $g_Z$ respectively, the inclination angle $\theta$ will be given by:

$$\theta = a\tan(g_X^2 g_Y^2)/(g_X^2 + g_Y^2 + g_Z^2)^{\frac{1}{2}}$$

and the high-side angle $\phi$ will be given by:

$$\phi = a\tan(g_Y/-g_X)$$

$g_X$, $g_Y$ and $g_Z$ must be corrected for the effects of the instrument traversing a non-rectilinear path.

The rate measurement of the gyro-wheel 46 about the OX' axis as measured by the appropriate pickoffs 62 of the tuned gyro 12 can then be used to compute the azimuth angle $\Psi$ as the instrument is traversed along the path of the borehole. The rate measured about the OX' axis, $r_X = \omega_X + \Omega_X$ where $\omega_X$ is the rate of rotation of the instrument about the OX' axis and $\Omega_X$ is the rate of rotation of the earth about the OX' axis. Since $\phi = 0$, the azimuth angle $\Psi$ may be computed from the time integral $\dot{\Psi}$, where $\dot{\Psi} = -\omega_X/\sin\theta = -(r_X - \Omega_X)\sin\theta$ where $\Omega_X = R_T\cdot\cos\Psi\cdot\cos\theta + R_R\cdot\sin\theta$, $R_T = R_E\cdot\cos\lambda$ and $R_R = R_E\cdot\sin\lambda$ where $R_E$ is the earth's rate of rotation about its axis and $\lambda$ is the geographical latitude.

The second and third measurement phases are mutually complementary since, for inclinations in excess of 45° to the vertical, the second measurement phase would tend to give increasingly inaccurate results with increasing inclination, whereas, for inclinations of 0° to 45° to the vertical, the third measurement phase would give increasingly inaccurate results with decreasing inclination.

Theoretical Background

If the instrument is moved in such a manner that the longitudinal instrument axis OZ' remains parallel to the borehole axis during the traverse, then the rates of rotation of the instrument about the casing-fixed axes are defined as $\omega_X$, $\omega_Y$ and $\omega_Z$ respectively. If the instantaneous rates of rotation are defined in terms of the rates $\dot{\theta}$ and $\dot{\Psi}$, where these rates are defined by the changes in borehole parameters $\theta$ and $\Psi$ as the instrument moves along the borehole path, then the rate of rotation of the instrument can be defined in the earth-fixed frame by:

$$\overline{R}_P = -\dot{\theta}\cdot\sin\Psi\cdot\overline{U}_N + \dot{\theta}\cdot\cos\Psi\cdot\overline{U}_E + \dot{\Psi}\cdot\overline{U}_V$$

Operating on the vector $\overline{R}_p$ to transform it into casing-fixed components yields:

$$\{\phi\}\{\theta\}\{\Psi\}\cdot\overline{R}_P = (-\sin\theta\cdot\cos\theta\cdot\dot{\Psi} + \dot{\theta}\cdot\sin\phi)\cdot\overline{U}_X + (\sin\theta\cdot\sin\phi\cdot\dot{\Psi} + \dot{\theta}\cdot\cos\phi)\cdot\overline{U}_Y + (\cos\theta\cdot\dot{\Psi})\cdot\overline{U}_Z.$$

Thus, $$\omega_X = -\sin\theta\cdot\cos\phi\cdot\dot{\Psi} + \dot{\theta}\cdot\sin\phi \quad (1)$$

$$\omega_Y = \sin\theta\cdot\sin\phi\cdot\dot{\Psi} + \dot{\theta}\cdot\cos\phi \quad (2)$$

$$\omega_Z = \cos\theta\cdot\dot{\Psi} \quad (3)$$

Solving Equations 1 and 2 above for $\dot{\Psi}$ and $\dot{\theta}$ yields:

$$\dot{\Psi} = -\{\omega_X\cdot\cos\phi - \omega_Y\cdot\sin\phi\}/\sin\theta \quad (4)$$

$$\dot{\theta} = \omega_X\cdot\sin\phi + \omega_Y\cdot\cos\phi \quad (5)$$

If the magnitude of the earth's rate of rotation about its axis is $R_E$, then the earth's rate of rotation can be defined in the earth-fixed frame by:

$$\overline{R}_E = R_E \cos \lambda \cdot \overline{U}_N - R_E \sin \lambda \cdot \overline{U}_V$$

or $$\overline{R}_E = R_T \overline{U}_N - R_R \cdot \overline{U}_V$$

Operating on the vector $\overline{R}_E$ to transform it into casing-fixed components yields:

$$\Omega_X = R_T \cos \Psi \cdot \cos \theta \cdot \cos \phi + R_R \sin \theta \cdot \cos \phi - R_T \sin \Psi \cdot \sin \phi \quad (6)$$

$$\Omega_Y = -R_T \cos \Psi \cdot \cos \theta \cdot \sin \phi - R_R \sin \theta \cdot \sin \phi - R_T \sin \Psi \cdot \cos \phi \quad (7)$$

$$\Omega_Z = R_T \cos \Psi \cdot \sin \theta - R_R \cos \theta \quad (8)$$

where $\Omega_X$, $\Omega_Y$ and $\Omega_Z$ are the rate of rotation of the earth about the casing-fixed axes.

We claim:

1. An instrument for monitoring the direction of a borehole, comprising an elongate casing having its longitudinal axis coincident, in use, with the axis of the borehole, an outer gimbal pivotally mounted within the casing with its pivot axis coincident with the longitudinal axis thereof, a rate gyroscope unit mounted in the outer gimbal and adapted to provide outputs indicative of the rates of rotation about the outer gimbal axis and an axis transverse to the outer gimbal axis, torquing means for applying a torque to the outer gimbal, first actuating means for actuating the torquing means when the instrument is disposed at the mouth of the borehole so as to pivot the outer gimbal about its axis, whereby, in use, the alignment of said transverse axis relative to an East/West direction is determined from the rate of rotation about said transverse axis sensed by the gyroscope unit, second actuating means for actuating the torquing means in response to the rate of rotation about the outer gimbal axis sensed by the gyroscope unit as the instrument is moved along the borehole so as to stabilize the outer gimbal about its axis, and a gravity sensor unit for sensing two components of gravity in two transverse directions, means for determining the high-side angle of the instrument as it is moved along the borehole from the sensed components of gravity, and third actuating means for actuating the torquing means in response to the rate of rotation about said transverse axis sensed by the gyroscope unit as the instrument is moved along the borehole at high inclination angles so as to maintain the high-side angle zero.

2. An instrument according to claim 1, further comprising resolver means for sensing the angle of rotation of the outer gimbal about its axis relative to the casing.

3. An instrument according to claim 1, wherein the gravity sensor unit is mounted on the outer gimbal.

4. An instrument according to claim 1, wherein the gravity sensor unit is mounted on the casing.

5. An instrument according to claim 1, wherein the gravity sensor unit is adapted to sense three components of gravity in three non-coplanar directions.

6. An instrument according to claim 1, wherein the gyroscope unit is a two-axis dynamically tuned gyroscope.

7. A method of surveying a borehole comprising positioning at the mouth of the borehole a survey instrument comprising an elongate casing having its longitudinal axis coincident with the axis of the borehole, an outer gimbal pivotally mounted within the casing with its pivot axis coincident with the longitudinal axis thereof, and a rate gyroscope unit mounted in the outer gimbal and adapted to provide outputs indicative of the rates of rotation about the outer gimbal axis and an axis transverse to the outer gimbal axis; sensing the rate of rotation about said transverse axis by means of the gyroscope unit and applying a torque to the outer gimbal so as to pivot the outer gimbal about its axis, whereby the alignment of said transverse axis relative to an East/West direction is determined from the sensed rate; moving the survey instrument along the borehole; continually sensing the rate of rotation about the outer gimbal axis by means of the gyroscope unit as the instrument moves along the borehole and applying a torque to the outer gimbal in dependence on the sensed rate so as to stabilize the outer gimbal about its axis; continually sensing two components of gravity in two transverse directions relative to the outer gimbal or the casing; determining at least the inclination and azimuth of the borehole at a plurality of points along its length from the sensed components of gravity, and at high inclination angles of the borehole, the rate of rotation about said transverse axis is continually sensed by means of the gyroscope unit as the instrument moves along the borehole and a torque is applied to the outer gimbal in dependence on the sensed rate so as to maintain the high-side angle as determined from the sensed components of gravity zero.

* * * * *